(12) United States Patent
Ishihara

(10) Patent No.: US 9,221,408 B2
(45) Date of Patent: Dec. 29, 2015

(54) POWER SUPPLY CONTROL APPARATUS FOR VEHICLE

(75) Inventor: Akio Ishihara, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 18 days.

(21) Appl. No.: 14/236,528

(22) PCT Filed: Jul. 31, 2012

(86) PCT No.: PCT/JP2012/069379
§ 371 (c)(1),
(2), (4) Date: Apr. 7, 2014

(87) PCT Pub. No.: WO2013/018780
PCT Pub. Date: Feb. 7, 2013

(65) Prior Publication Data
US 2015/0073653 A1  Mar. 12, 2015

(30) Foreign Application Priority Data
Aug. 1, 2011  (JP) .................................. 2011-168649

(51) Int. Cl.
*G06F 7/00* (2006.01)
*B60R 16/03* (2006.01)
(Continued)

(52) U.S. Cl.
CPC ............ *B60R 16/03* (2013.01); *B60H 1/00657* (2013.01); *B60S 1/08* (2013.01)

(58) Field of Classification Search
CPC ................................................ B60L 2240/445
USPC ............................................................ 701/22
See application file for complete search history.

(56) References Cited

U.S. PATENT DOCUMENTS

| | | | | |
|---|---|---|---|---|
| 6,040,637 A | * | 3/2000 | Paganini | ........... B60R 21/01566 280/728.1 |
| 2005/0225175 A1 | * | 10/2005 | Maehara | ............... B60W 10/06 307/10.1 |

(Continued)

FOREIGN PATENT DOCUMENTS

| JP | A-2005-325832 | 11/2005 |
|---|---|---|
| JP | A-2007-15506 | 1/2007 |

(Continued)

OTHER PUBLICATIONS

Sep. 11, 2012 International Search Report issued in International Patent Application No. PCT/JP2012/069379.

*Primary Examiner* — Redhwan k Mawari
(74) *Attorney, Agent, or Firm* — Oliff PLC

(57) ABSTRACT

A vehicle power supply control apparatus is provided including a power supply control unit, a control signal connection circuit unit, a remote operation signal obtaining unit for receiving a remote operation signal, a power supply control unit that is operated during remote operation, relays serving as electrical path opening/closing units, and fuses. An air conditioner and a heater are connected to an electrical path that is opened and closed by the relay. A wiper, a washer and a turn signal relay are connected to an electrical path that is opened and closed by the relay. If the remote operation signal obtaining unit obtains a remote operation signal, the control signal connection circuit unit turns the relay off, and does not switch an electrical current on to the electrical path to which the wiper, the washer, and the turn signal relay are connected.

8 Claims, 7 Drawing Sheets

(51) Int. Cl.
  *B60H 1/00* (2006.01)
  *B60S 1/08* (2006.01)

(56) References Cited

U.S. PATENT DOCUMENTS

2006/0023477 A1* 2/2006 Lee .................. H02M 3/33523
363/65

2015/0073653 A1* 3/2015 Ishihara ............. B60H 1/00657
701/36

FOREIGN PATENT DOCUMENTS

| JP | A-2009-67154 | 4/2009 |
| JP | A-2009-196481 | 9/2009 |

* cited by examiner

POWER SUPPLY CONTROL APPARATUS FOR VEHICLE

This application is the national phase of PCT International Application No. PCT/JP2012/069379 that has an International filing date of Jul. 31, 2012 and designated the United States of America and claims priority to Japanese Patent App. No. JP 2011-168649 that was filed on Aug. 1, 2011. The disclosure of the prior applications is hereby incorporated by reference herein in their entirety.

BACKGROUND

With recent advancement in electronics, many vehicles are provided with an electronic control unit (ECU) for controlling not only an engine but also various types of electronic components such as a battery, a door, a lamp, and a wiper. In order to improve user's convenience, the electronic components installed in the vehicle can also be controlled by remote operation by transmitting a signal to the vehicle (ECU) from a mobile terminal device such as a remote controller.

For example, a vehicle remote operation system is disclosed that causes a vehicle to execute a required operation in accordance with a remote operation request from a user (see JP 2007-15506A). When, for example, the ambient temperature is high in summer, the user can activate an air conditioner by remote operation in advance before he or she gets inside the vehicle, and set the temperature in the vehicle interior to an appropriate temperature.

FIG. 7 is a block diagram illustrating an example of a configuration of a power supply control apparatus for a vehicle. As shown in FIG. 7, the power supply control apparatus for a vehicle includes a power supply unit 80 that is constituted by a high-voltage battery 81, a DC/DC converter 82, an auxiliary battery 83, and the like, a remote operation signal obtaining unit 70 for obtaining a remote operation signal from a remote controller, a power supply control unit 200, relays 10 and 20, fuses 30, 31, 32, 33, and 34, and the like. An air conditioner 1 and another component (such as an ECU) 2 are connected to an electrical path that is opened and closed by the relay 10. Also, a wiper 3, a washer 4, and a turn signal relay 5, serving as loads, are connected to an electrical path that is opened and closed by the relay 20.

The power supply state of a vehicle shifts from an "OFF" state to an "Accessory-ON (ACC-ON)" state, an "Ignition-ON (IG-ON)" state, and a state for starting an engine (READY-ON), in that order. In the "ACC-ON" state, electrical power is applied to at least one device such as an audio device, and in the "IG-ON" state, electrical power is applied to all the devices. If a vehicle in which operations of devices can be controlled externally of the vehicle by remote operation has received a remote operation signal from, for example, a remote controller, the power supply state is shifted to the "IG-ON" state, and the air conditioner 1 or another device (such as an ECU) 2 is activated.

SUMMARY

Technical Problem

However, there are cases where, for example, a user switches off an engine switch while switches for a wiper, a washer, and the like are in the on state. In such a case, if the user activates an air conditioner or the like by remote operation, a conventional system may suffer from the problem that electrical power is also applied to the wiper and the washer, and such devices that are not expected by the user operate.

Provided herein is a vehicle power supply control apparatus that allows prevention of unexpected operation of a device that is not wanted to be operated during remote operation.

Solution to Problem

A vehicle power supply control apparatus is provided including a plurality of electrical path opening/closing units that switch electrical currents to a plurality of loads on/off, the vehicle power supply control apparatus further including: a remote operation signal obtaining unit configured to obtain a remote operation signal for controlling a switching on/off of an electrical current to a load that is to be remotely operated; a first power supply control unit configured to control a turning off of at least one of the plurality of electrical path opening/closing units, if the remote operation signal obtaining unit has obtained a remote operation signal; and a second power supply control unit configured to control a turning on/off of the plurality of electrical path opening/closing units, if the remote operation signal obtaining unit has not obtained a remote operation signal.

A vehicle power supply control apparatus is provided, wherein the first power supply control unit is configured to control a turning off of an electrical path opening/closing unit that switches on/off an electrical current to a load other than the load to be remotely operated if the remote operation signal obtaining unit has obtained a remote operation signal.

A vehicle power supply control apparatus is provided, wherein the second power supply control unit is configured to control a turning on/off of the plurality of electrical path opening/closing units in response to a switching on/off of an ignition switch.

A vehicle power supply control apparatus is provided, wherein the load to be remotely operated is at least one of an air conditioner, a heater, a defroster, and a deicer.

A vehicle power supply control apparatus is provided, wherein the load other than the load to be remotely operated is at least one of a wiper, a washer, and a turn signal relay.

A vehicle power supply control apparatus is provided, wherein the remote operation signal obtaining unit is configured to obtain any one of a remote operation signal transmitted from a remote controller, a remote operation signal transmitted via a communication line, and a remote operation signal transmitted via an electric power line.

The remote operation signal obtaining unit, which obtains a remote operation signal for controlling a switching on/off of an electrical current to a load that is to be remotely operated, the first power supply control unit, which controls a turning off of at least one of the plurality of electrical path opening/closing units if the remote operation signal obtaining unit has obtained a remote operation signal, and the second power supply control unit, which controls a turning on/off of the plurality of electrical path opening/closing units if the remote operation signal obtaining unit has not obtained a remote operation signal, are provided. In the case where, for example, two electrical path opening/closing units that respectively switch on/off electrical currents to an air conditioner and a wiper that serve as loads are provided, the first power supply control unit controls a switching off of an electrical current to the electrical path to which the wiper, serving as one of the two electrical path opening/closing units, is connected, if the remote operation signal obtaining unit has obtained a remote operation signal. The second power supply control unit controls a switching on/off of electrical currents to the electrical paths to which the air conditioner and the wiper, serving as the above-described two electrical path opening/closing units, are connected, if the remote operation signal obtaining unit has not obtained a remote operation signal. Accordingly, when a user remotely operates a load (device), it is possible to switch on/off an electrical current to the desired device (for example, an air conditioner), and to prevent a device (for example, a wiper) other than the desired device from operating.

The first power supply control unit controls a turning off of an electrical path opening/closing unit that switches on/off an electrical current to a load other than the load to be remotely operated, if the remote operation signal obtaining unit has obtained a remote operation signal. In the case where, for example, two electrical path opening/closing units that respectively switch on/off electrical currents to the air conditioner and the wiper, serving as loads, are provided, in which the air conditioner serves as a load to be remotely operated and the wiper serves as a load other than the load to be remotely operated, the first power supply control unit controls a turning off of the electrical path opening/closing unit that switches the electrical current to the wiper on/off. Accordingly, when a user remotely operates a load (device), it is possible to switch on/off an electrical current to a desired device (for example, an air conditioner), and to prevent a device (for example, a wiper) other than the desired device from operating.

The second power supply control unit controls a turning on/off of the plurality of electrical path opening/closing units in response to a switching on/off of an ignition switch. For example, the ignition switch is switched on by shifting the engine switch to the "IG-ON" state, and it is thus possible to operate a device not remotely.

The load to be remotely operated is at least one of an air conditioner, a heater, a defroster, and a deicer. Accordingly, it is possible to remotely control operation of an air conditioner, a heater, a defroster, or a deicer, as a desired device.

The load other than the load to be remotely operated is at least one of a wiper, a washer, and a turn signal relay. Accordingly, it is possible to prevent a device, such as a wiper, a washer, or a turn signal relay, from being remotely operated.

The remote operation signal obtaining unit obtains any one of a remote operation signal transmitted from a remote controller, a remote operation signal transmitted via a communication line, and a remote operation signal transmitted via an electric power line. The remote operation signal transmitted via a communication line is, if it is transmitted, for example, from a mobile phone via a telephone line, a signal transmitted from a communication apparatus, an information processing terminal device, or the like via wireless communication or the Internet (LAN). Also, the remote operation signal transmitted via an electric power line is, for example, a signal transmitted from a home power supply, a charging station, or the like via electric power line communication (PLC).

Advantageous Effects

By providing a remote operation signal obtaining unit for obtaining a remote operation signal for controlling a switching on/off of an electrical current to a load that is to be remotely operated; a first power supply control unit configured to control a turning off of at least one of the plurality of electrical path opening/closing units if the remote operation signal obtaining unit has obtained a remote operation signal; and a second power supply control unit configured to control a turning on/off of the plurality of electrical path opening/closing units if the remote operation signal obtaining unit has not obtained a remote operation signal, it is possible, when a user remotely operates a load (device), to switch on/off an electrical current to the desired device (for example, an air conditioner or the like), and to prevent a device (for example, a wiper or the like) other than the desired device from operating.

DETAILED DESCRIPTION OF THE EMBODIMENTS

Embodiment 1

Figure 1:
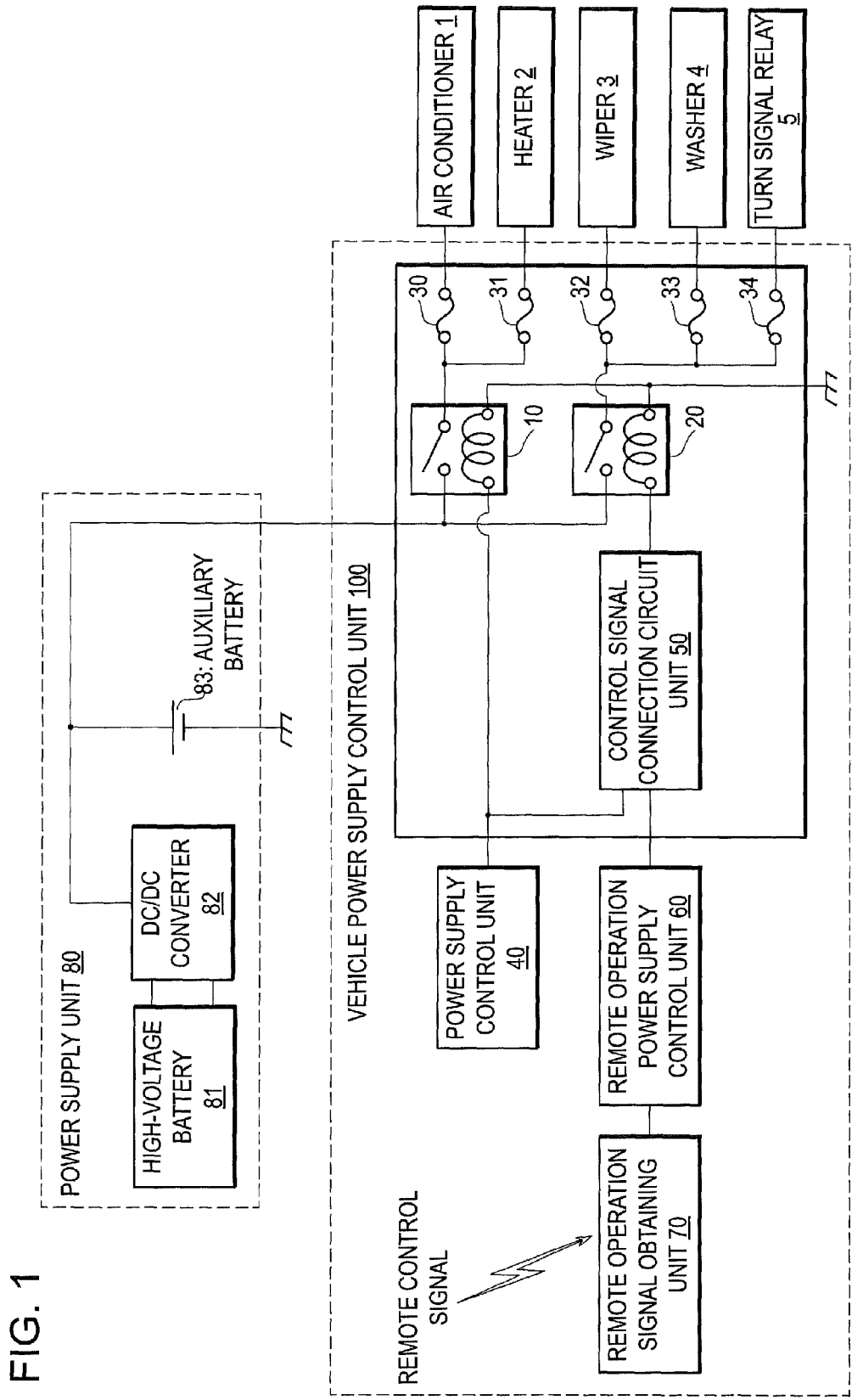
FIG. 1 is a block diagram illustrating an example of a configuration of a vehicle power supply control apparatus according to Embodiment 1.

Hereinafter, embodiments will be described with reference to the drawings illustrating embodiments thereof. FIG. 1 is a block diagram illustrating an example of a configuration of a vehicle power supply control apparatus 100 according to Embodiment 1. The vehicle power supply control apparatus 100 includes a power supply control unit 40 that serves as a second power supply control unit, a control signal connection circuit unit 50 that serves as a first power supply control unit, a remote operation signal obtaining unit 70 that obtains a remote operation signal, a power supply control unit 60 that is operated during remote operation (hereinafter, referred to as "remote operation power supply control unit 60"), relays 10 and 20 serving as electrical path opening/closing units, fuses 30, 31, 32, 33, and 34, and the like. Note that the remote operation signal may be a signal transmitted from a remote controller or a signal obtained by subjecting a signal transmitted from a remote controller to a predetermined conversion processing, that is, a signal that was not directly transmitted from a remote controller.

A power supply unit 80 constituted by a high-voltage battery 81, a DC/DC converter 82, an auxiliary battery 83, and the like is connected to the vehicle power supply control apparatus 100.

An air conditioner control unit (air conditioner ECU) 1 (hereinafter referred to also as "air conditioner"), and another ECU 2 (for example, an ECU for controlling a heater, which is hereinafter also referred to as "heater"), serving as loads, are connected to an electrical path that is opened and closed by the relay 10. Also, a wiper 3, a washer 4, and a turn signal relay 5, serving as loads, are connected to an electrical path that is opened and closed by the relay 20. By controlling opening and closing of the electrical paths by the relays 10 and 20, it is possible to supply electric power from the power supply unit 80 to the loads. Note that switches for turning on/off the wiper 3, the washer 4, and the turn signal relay 5 are not shown.

Figure 2:
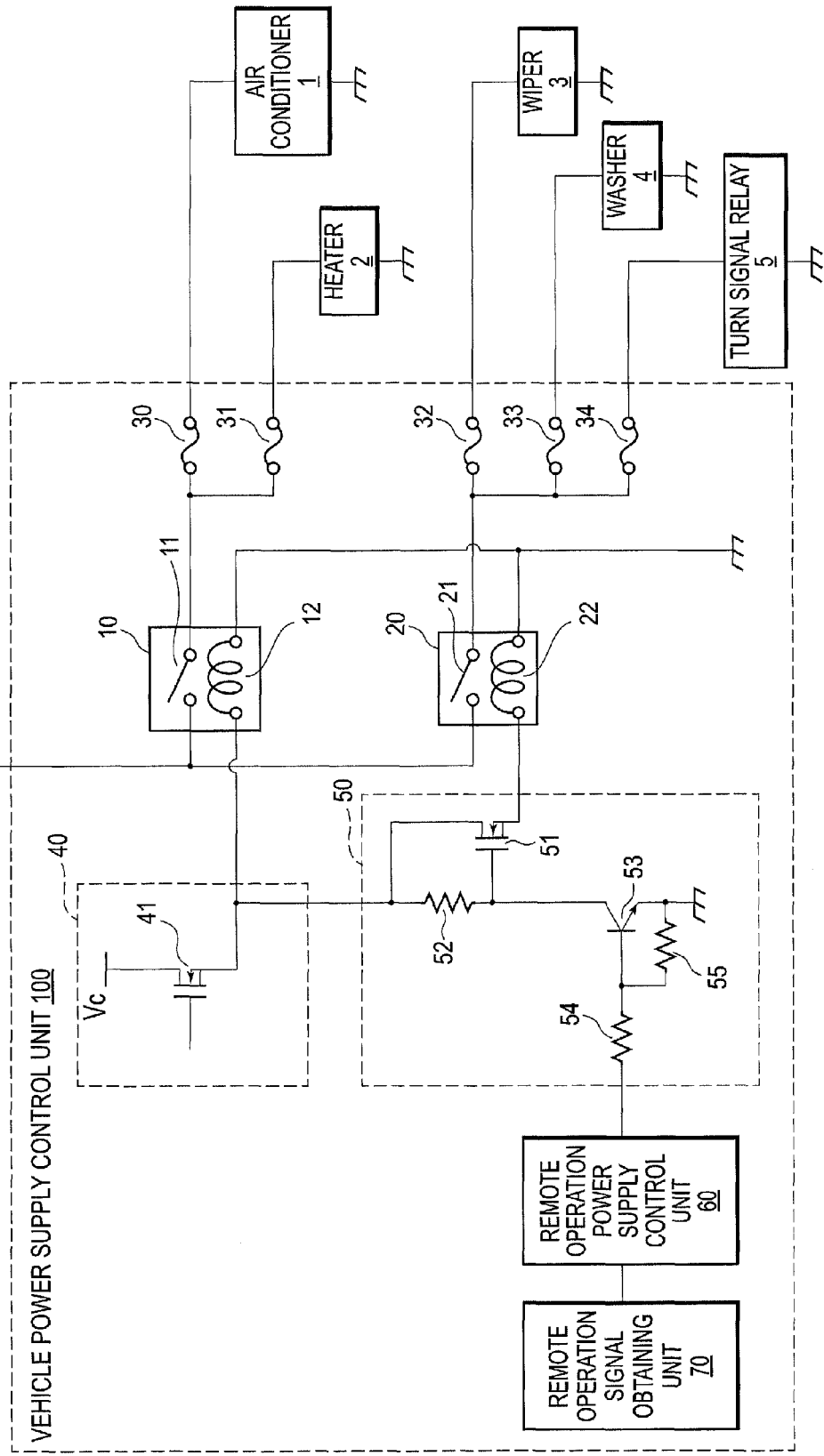
FIG. 2 is a circuit diagram illustrating an example of the configuration of the vehicle power supply control apparatus according to Embodiment 1.

FIG. 2 is a circuit diagram illustrating an example of the configuration of the vehicle power supply control apparatus 100 according to Embodiment 1. As shown in FIG. 2, the power supply control unit 40 includes an FET 41, to whose gate a binarized signal is input in response to a switching on/off of an ignition switch. The drain of the FET 41 is connected to a predetermined voltage Vc, and the source of the FET 41 is connected to one end of a coil 12 of the relay 10. When the ignition switch is turned on and the power supply state shifts to the "IG-ON" state, the FET 41 is turned on and an electrical current flows through the coil 12, thereby a relay contact 11 being closed. Accordingly, a predetermined voltage is applied to the air conditioner 1 and the heater 2, and they are in the operating state. Note that a binarized signal is input to the gate of the FET 41 also in accordance with remote operation by a remote controller, and the FET 41 is turned on under remote operation.

The control signal connection circuit unit 50 includes an FET 51, a transistor 53, resistors 52, 54, and 55, and the like. The gate of the FET 51 is connected to the collector of the transistor 53, the drain of the FET 51 is connected to the source of the FET 41, and the source of the FET 51 is connected to one end of a coil 22 of the relay 20. The base of the transistor 53 is connected to the remote operation power supply control unit 60 via the resistor 54.

The remote operation signal obtaining unit 70 obtains a remote operation signal from a remote controller (not shown), and outputs the obtained remote operation signal to the remote operation power supply control unit 60.

When a remote operation signal is input to the remote operation power supply control unit 60 from the remote operation signal obtaining unit 70, the remote operation power supply control unit 60 outputs a binarized signal that depends on the remote operation signal to the base of the transistor 53.

For example, when a user operates the remote controller in order to remotely activate the air conditioner 1, the remote operation power supply control unit 60 outputs a high-level signal. Accordingly, the transistor 53 is turned on and the FET 51 is turned off. Since, thus, no current flows through the coil 22 and the relay contact 21 remains open, no electrical currents flow to the wiper 3, the washer 4, and the turn signal relay 5 and they do not operate unexpectedly.

On the other hand, when the user operates an engine starter switch, instead of the remote controller, so as to switch the ignition switch on, the remote operation power supply control unit 60 does not obtain a remote operation signal and thus outputs a low-level signal. Accordingly, the transistor 53 is turned off and the FET 51 is turned on. Since, thus, an electrical current flows through the coil 22 and the relay contact 21 is closed, electrical currents flow to the air conditioner 1, the heater 2, and the wiper 3, the washer 4, and the turn signal relay 5 and they can operate.

In other words, the loads such as the air conditioner 1 and the heater 2 that are connected to the electrical path that is opened and closed by the relay 10 are loads to be operated by a remote operation signal or loads that cause no problem when they are operated. On the other hand, the loads such as the wiper 3, the washer 4, and the turn signal relay 5 that are connected to the electrical path that is opened and closed by the relay 20 are loads to be not operated by a remote operation signal.

Figure 3:
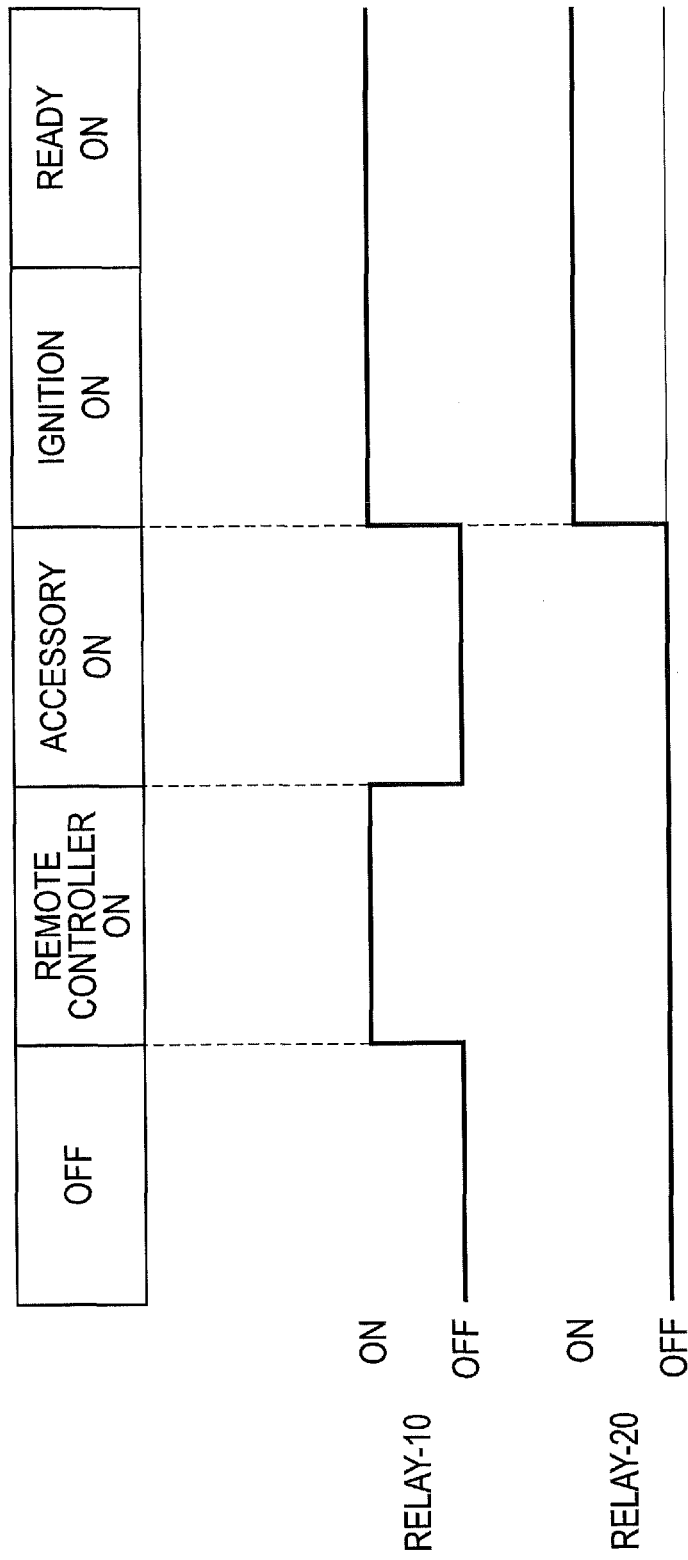
FIG. 3 is a diagram illustrating an example of shift of the power supply state by the vehicle power supply control apparatus.

FIG. 3 is a diagram illustrating an example of the shift of the power supply state caused by the vehicle power supply control apparatus 100. As shown in FIG. 3, the power supply state includes an "OFF" state, a "Remote controller-ON" state, an "Accessory-ON" (ACC-ON) state, an "Ignition-ON" (IG-ON) state, and a "READY-ON" state.

The "OFF" state is a state in which an engine switch is switched off. The "Remote controller-ON" state is a state in which a remote operation signal is received from a remote controller. The "ACC-ON" state is a state in which a predetermined voltage is applied to at least one device such as an audio device (not shown) and this device is made available. The "IG-ON" state is a state in which a predetermined voltage is applied to all the devices. The "READY-ON" state is a state in which a motor is started so as to ignite an engine. The power supply state shifts to the "IG-ON" state when the engine is activated.

As shown in FIG. 3, in the "Remote controller-ON" state, since the remote operation power supply control unit 60 outputs a high-level signal and the high-level signal is input to the gate of the FET 41, the FET 41 is turned on and the FET 51 is turned off. Accordingly, an electrical current flows through the coil 12 of the relay 10, and the relay contact 11 is closed (turned on). In contrast, an electrical current does not flow through the coil 22 of the relay 20, and the relay contact 21 remains open (turned off).

In the "IG-ON" state (in which the remote controller is in the off-state), since the remote operation power supply control unit 60 outputs a low-level signal and a high-level signal is input to the gate of the FET 41, the FET 41 is turned on and the FET 51 is also turned on. Accordingly, an electrical current flows through the coil 12 of the relay 10, and the relay contact 11 is closed (turned on). An electrical current also flows through the coil 22 of the relay 20, and the relay contact 21 is closed (turned on).

In the present embodiment, the remote operation signal obtaining unit 70, which obtains a remote operation signal for controlling a switching on/off of an electrical current to a load that is to be remotely operated, the control signal connection circuit unit 50, which controls a turning off of the relay 20, that is, one of the relays 10 and 20 if the remote operation signal obtaining unit 70 has obtained a remote operation signal, and the power supply control unit 40, which controls a turning on/off of the relays 10 and 20 if the remote operation signal obtaining unit 70 has not obtained a remote operation signal, are provided.

If the remote operation signal obtaining unit 70 has not obtained a remote operation signal, the power supply control unit 40 turns the relays 10 and 20 on/off, and controls a switching on/off of an electrical current to the electrical paths to which the air conditioner 1, the heater 2, the wiper 3, the washer 4, and the turn signal relay 5 are connected.

On the other hand, if the remote operation signal obtaining unit 70 has obtained a remote operation signal, the control signal connection circuit unit 50 turns the relay 20 off, and does not apply an electrical current to the electrical path to which the wiper 3, the washer 4, and the turn signal relay 5 are connected. Accordingly, if a user remotely operates a load (device), it is possible to switch on/off an electrical current to the desired device (for example, an air conditioner, and a heater), and to prevent devices (for example, a wiper, a washer, and a turn signal relay) other than the desired device from operating.

In the above-described embodiment, an air conditioner and a heater were taken as examples of a load that is to be remotely operated using a remote controller, but the present invention is not limited thereto, and examples of such a load may include a defroster or a deicer. That is, a load to be remotely operated using a remote controller may be at least one of an air conditioner, a heater, a defroster, and a deicer, or a combination thereof. Accordingly, it is possible to remotely control the operation of the air conditioner, the heater, the defroster, or the deicer, serving as a desired device, and to prevent devices (for example, a wiper, a washer, a turn signal relay, and the like) other than the desired device from being remotely operated. It is also possible to prevent a wiper or the like from being operated, without providing a relay, in addition to the relays 10 and 20.

Also, the power supply control unit 40 controls a turning on/off of the relays 10 and 20 in response to a switching on/off of the ignition switch. For example, by shifting the engine switch to the "IG-ON" state, the ignition switch is switched on, and it is thus possible to operate a device not remotely.

Also, the control signal connection circuit unit 50 controls a turning off of the relay 20, which switches on/off an electrical current to at least one of the wiper 3, the washer 4, and the turn signal relay 5. Accordingly, if a desired device (for example, an air conditioner or the like) is remotely operated, it is possible to prevent at least one of the wiper, the washer, and the turn signal relay from operating unexpectedly.

Embodiment 2

Figure 4:
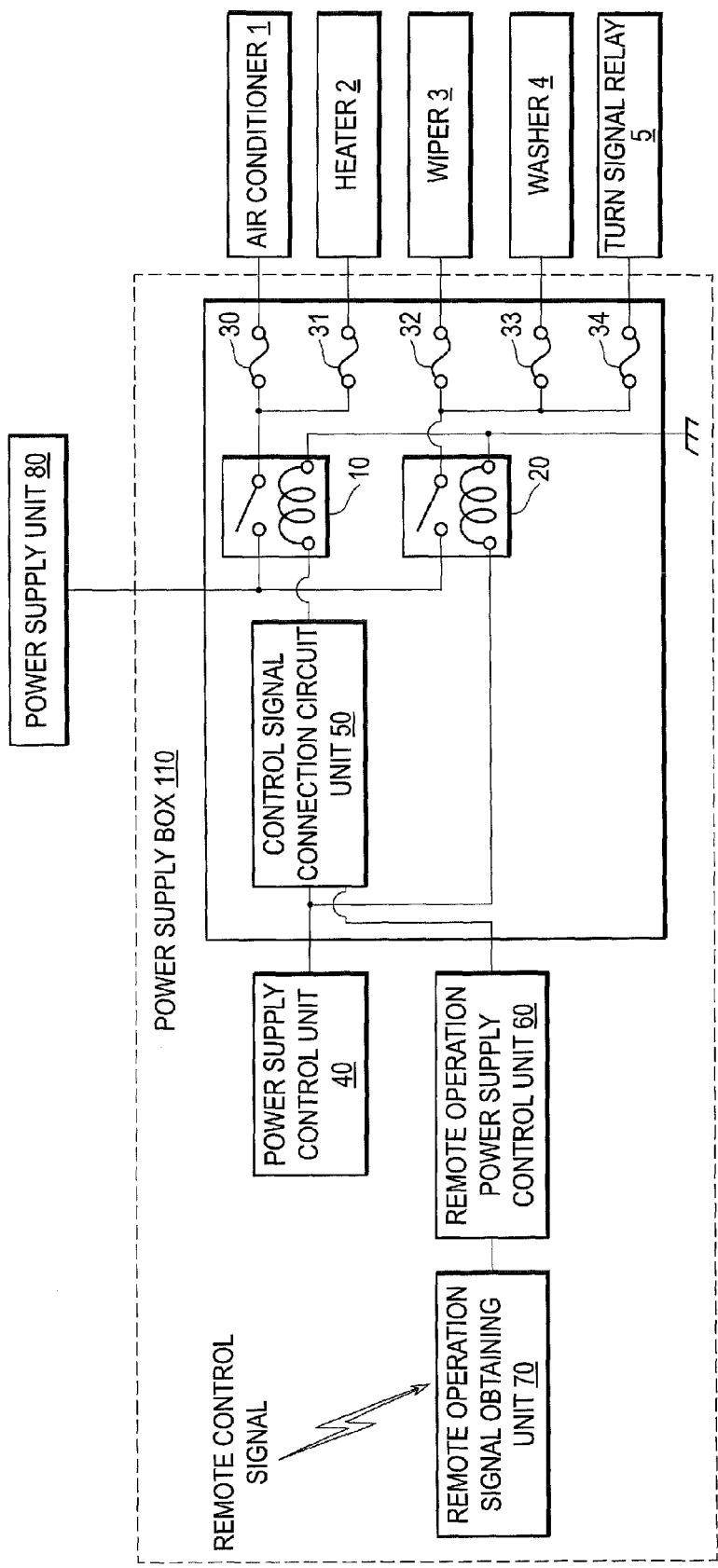
FIG. 4 is a block diagram illustrating an example of a configuration of a vehicle power supply control apparatus according to Embodiment 2.

FIG. 4 is a block diagram illustrating an example of a configuration of a vehicle power supply control apparatus 110 according to Embodiment 2. Similarly to that of Embodiment 1, the vehicle power supply control apparatus 110 includes the power supply control unit 40, the control signal connection circuit unit 50, the remote operation signal obtaining unit 70, the remote operation power supply control unit 60, the relays 10 and 20, the fuses 30, 31, 32, 33, and 34, and the like. Embodiment 2 differs from Embodiment 1 in that an output terminal of the control signal connection circuit unit 50 is connected to a coil of the relay 10, instead of a coil of the relay 20.

If the remote operation signal obtaining unit 70 has not obtained a remote operation signal, the power supply control unit 40 controls a switching on/off of electrical currents to the electrical paths to which the air conditioner 1, the heater 2, the wiper 3, the washer 4, and the turn signal relay 5 are connected via the relays 10 and 20.

On the other hand, if the remote operation signal obtaining unit 70 has obtained a remote operation signal, the control signal connection circuit unit 50 switches an electrical current on to the electrical path to which the air conditioner 1 and the heater 2 are connected via the relay 10. Also, the electrical path to which the wiper 3, the washer 4, and the turn signal relay 5 are connected via the relay 20 remains in the off state. Accordingly, in the case where a load (device) is remotely operated, it is possible to switch on/off an electrical current to the desired device (for example, an air conditioner or a heater), and to prevent devices (for example, a wiper, a washer, and a turn signal relay) other than the desired device from operating.

Embodiment 3

Figure 5:
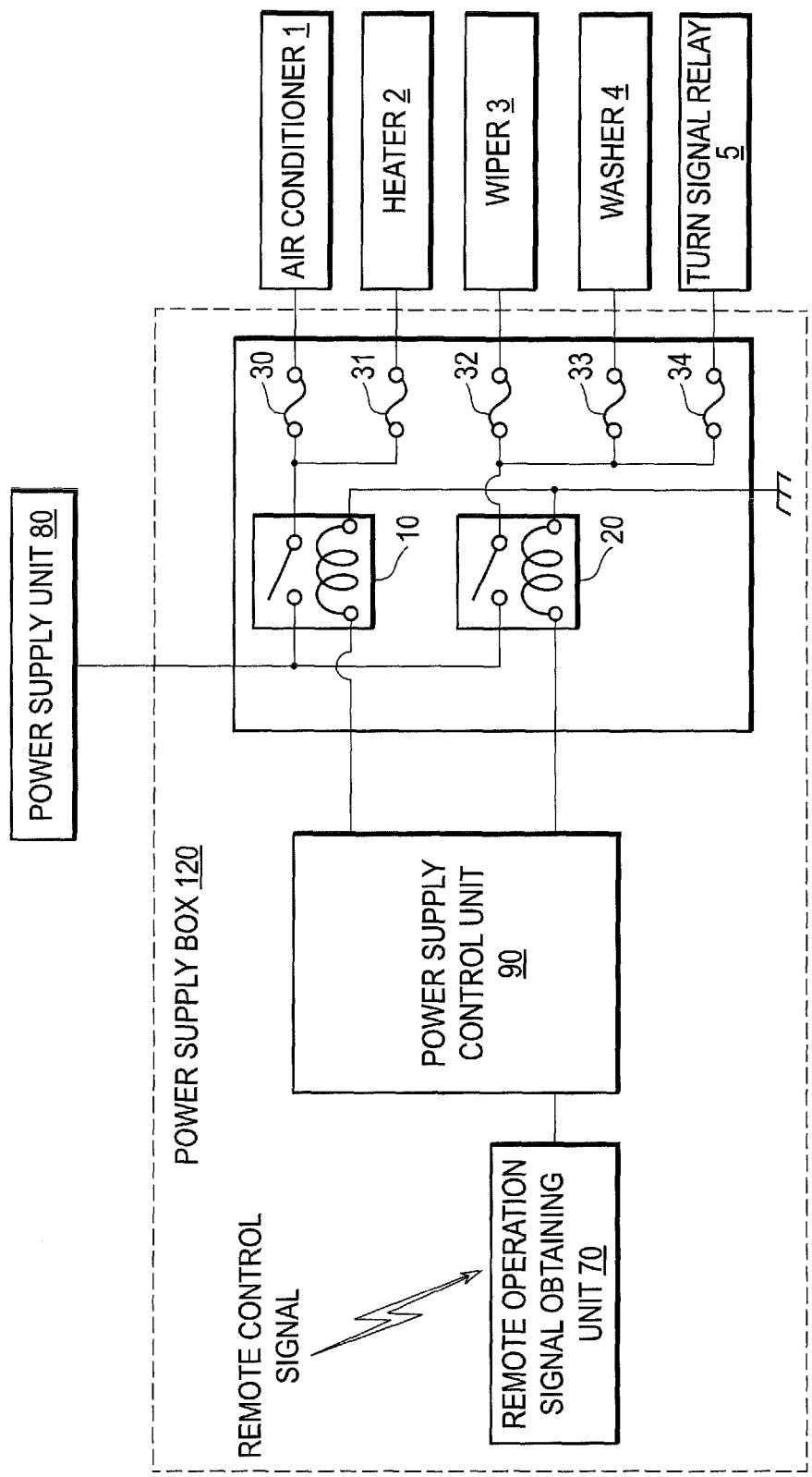
FIG. 5 is a block diagram illustrating an example of a configuration of a vehicle power supply control apparatus according to Embodiment 3.

FIG. 5 is a block diagram illustrating an example of a configuration of a vehicle power supply control apparatus 120 according to Embodiment 3. Embodiment 3 differs from Embodiment 1 in that the vehicle power supply control apparatus 120 includes a power supply control unit 90, instead of the power supply control unit 40, the control signal connection circuit unit 50, and the remote operation power supply control unit 60. Note that the relays 10 and 20, the fuses 30 to 34 and the air conditioner 1, the heater 2, the wiper 3, the washer 4, and the turn signal relay 5 are the same as those in Embodiment 1.

Figure 6:
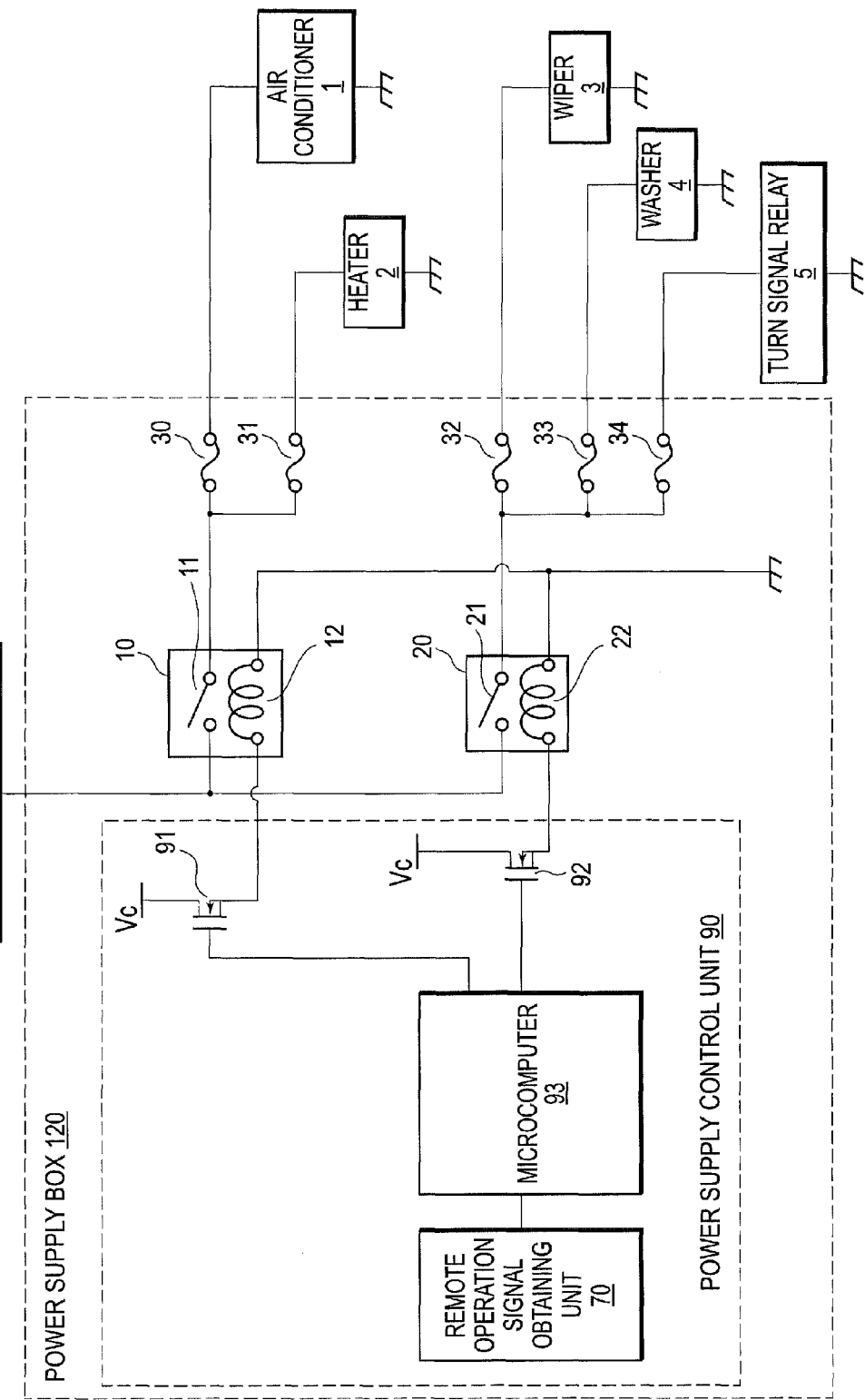
FIG. 6 is a circuit diagram illustrating an example of the configuration of the vehicle power supply control apparatus according to Embodiment 3.
Figure 7:
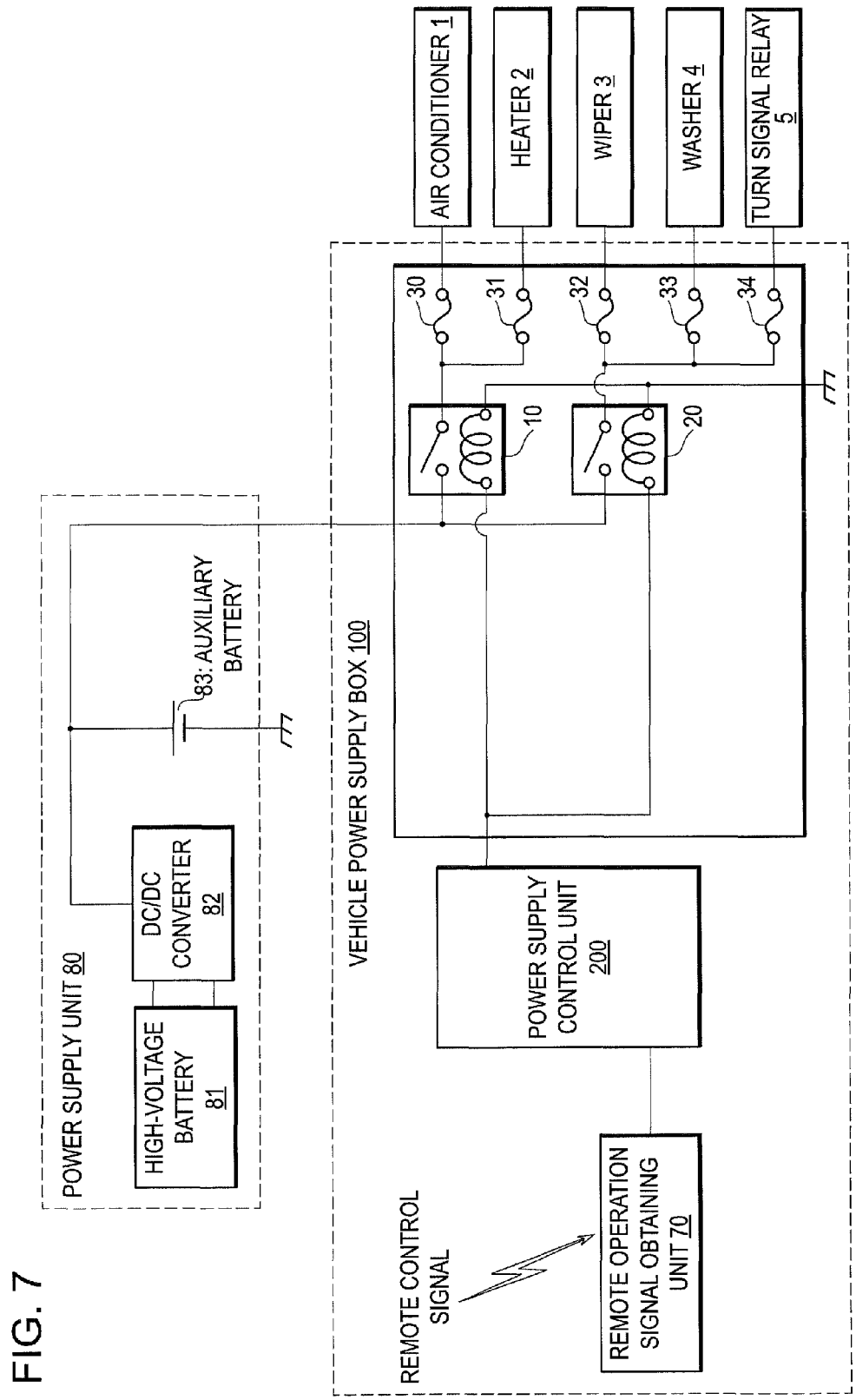
FIG. 7 is a block diagram illustrating an example of a configuration of a vehicle power supply control apparatus.

FIG. 6 is a circuit diagram illustrating an example of a configuration of the vehicle power supply control apparatus 120 of Embodiment 3. As shown in FIG. 6, the power supply control unit 90 includes FETs 91 and 92, a microcomputer 93, and the like. The microcomputer 93 obtains a remote operation signal and controls the FETs 91 and 92 to be turned on/off, thereby controlling the relays 10 and 20 to be turned on/off. That is, in Embodiment 3, the power supply control unit 90 has functions of the first power supply control unit and the second power supply control unit.

The power supply state and the On/Off state of the relays 10 and 20 are equivalent to those exemplified with reference to FIG. 2, and thus descriptions thereof are omitted.

The above-described Embodiments 1 to 3 have described the case where two relays 10 and 20 are provided that are turned on in the "IG-ON" state, but the number of the relays is not limited to two and three relays or more may be provided. In this case, it is also possible to provide the relays 20 that operate at different timings between when the devices are remotely operated and when the devices are not remotely operated.

The above-described embodiments are to prevent a device other than a desired device such as an air conditioner or the like from operating when the vehicle is remotely operated by a remote controller, whereas the present embodiment is not limited to the case where the vehicle is remotely operated. The present embodiment is applicable to, for example, the case where devices of a plug-in charged vehicle, such as an air conditioner, a heater, a defroster, a deicer, and the like, are operated while being charged.

In the above-described embodiments, the remote operation signal obtaining unit 70 is not limited to obtaining a remote operation signal transmitted from a remote controller. The remote operation signal obtaining unit 70 may obtain, for example, a remote operation signal transmitted via a communication line or a remote operation signal transmitted via an electric power line. The remote operation signal transmitted via a communication line is, if it is transmitted, for example, from a mobile phone via a telephone line, a signal transmitted from a communication apparatus, an information processing terminal device, or the like via wireless communication or the Internet (LAN). Also, the remote operation signal transmitted via an electric power line is, for example, a signal transmitted from a home power supply, a charging station, or the like via electric power line communication (PLC).

The invention claimed is:
1. A vehicle power supply control apparatus comprising:
a first electrical path opening/closing unit that switches an electrical current to a first vehicle accessory that is to be remotely operated;
a second electrical path opening/closing unit that switches an electrical current to a plurality of second vehicle accessories that does not include the first vehicle accessory;
a remote operation signal obtaining unit configured to obtain a remote operation signal for controlling a switching on/off of an electrical current to the first vehicle accessory;
a first power supply control unit configured to control a turning off of the second electrical path opening/closing unit, if the remote operation signal obtaining unit has obtained a remote operation signal; and a second power supply control unit configured to control a turning on/off of the first and second electrical path opening/closing units in response to a switching on/off of an ignition switch, wherein the first power supply control unit disables an on signal from the second power supply control unit to the second electrical path opening/closing unit if the remote operation signal obtaining unit has obtained a remote operation signal.

2. The vehicle power supply control apparatus according to claim 1, wherein the first vehicle accessory is an air conditioner, a heater, a defroster, or a deicer.

3. The vehicle power supply control apparatus according to claim 1, wherein the plurality of second vehicle accessories includes at least one of a wiper, a washer, and a turn signal relay.

4. The vehicle power supply control apparatus according to claim 1, wherein the remote operation signal obtaining unit is configured to obtain any one of a remote operation signal transmitted from a remote controller, a remote operation signal transmitted via a communication line, and a remote operation signal transmitted via an electric power line.

5. The vehicle power supply control apparatus according to claim 2, wherein the plurality of second vehicle accessories includes at least one of a wiper, a washer, and a turn signal relay.

6. The vehicle power supply control apparatus according to claim 2, wherein the remote operation signal obtaining unit is configured to obtain any one of a remote operation signal transmitted from a remote controller, a remote operation signal transmitted via a communication line, and a remote operation signal transmitted via an electric power line.

7. The vehicle power supply control apparatus according to claim 3, wherein the remote operation signal obtaining unit is configured to obtain any one of a remote operation signal transmitted from a remote controller, a remote operation signal transmitted via a communication line, and a remote operation signal transmitted via an electric power line.

8. The vehicle power supply control apparatus according to claim 5, wherein the remote operation signal obtaining unit is configured to obtain any one of a remote operation signal transmitted from a remote controller, a remote operation signal transmitted via a communication line, and a remote operation signal transmitted via an electric power line.

* * * * *